United States Patent [19]

Forch

[11] Patent Number: 4,546,985
[45] Date of Patent: Oct. 15, 1985

[54] LIP SEAL WITH CHANNELED AND NON-CHANNELED PORTIONS

[75] Inventor: Hans Forch, Birkenau, Fed. Rep. of Germany

[73] Assignee: Firma Carl Freudenberg, Weinheim, Fed. Rep. of Germany

[21] Appl. No.: 625,453

[22] Filed: Jun. 28, 1984

[30] Foreign Application Priority Data

Jul. 1, 1983 [DE] Fed. Rep. of Germany ....... 3323741

[51] Int. Cl.⁴ .............................................. F16J 15/32
[52] U.S. Cl. .................................... 277/134; 277/153; 277/166
[58] Field of Search ............... 277/133, 134, 152, 153, 277/166, 50

[56] References Cited

U.S. PATENT DOCUMENTS

| | | | |
|---|---|---|---|
| 3,515,395 | 6/1970 | Weinand | 277/134 |
| 3,534,969 | 10/1970 | Weinand | 277/134 X |
| 3,729,204 | 4/1973 | Augustin | 277/134 |
| 4,084,826 | 4/1978 | Vossieck et al. | 277/134 |
| 4,094,519 | 6/1978 | Heyn et al. | 277/134 |
| 4,288,083 | 9/1981 | Braconier | 277/153 X |

FOREIGN PATENT DOCUMENTS 1600458  8/1972  Fed. Rep. of Germany .
1252911  11/1971  United Kingdom .

Primary Examiner—Robert S. Ward
Attorney, Agent, or Firm—Felfe & Lynch

[57] ABSTRACT

A shaft seal ring has a support ring fixed to an annular machine element and a resilient lip ring engaging a co-axially rotatable shaft. Two intersecting conical surfaces form an innermost sealing edge on the lip ring. Channels extend from the sealing edge in one of the conical surfaces to a non-channeled portion thereof. Increasing pressure of a liquid sealed-in forces the channeled conical surface against the shaft to increase its sealing area correspondingly while the channels admit some of the liquid therebetween for lubrication.

20 Claims, 4 Drawing Figures

LIP SEAL WITH CHANNELED AND NON-CHANNELED PORTIONS

BACKGROUND OF THE INVENTION

The invention relates to a shaft seal ring.

A shaft seal ring is disclosed in German Pat. No. 16 00 458. It has channels which serve to feed back liquid which leaks past a sealing edge of the ring. To this end, the lateral surfaces of the channels make acute angles with the axis of the seal ring. Such a seal ring cannot be used, however, when the medium (liquid) sealed-in on one side of the seal ring exerts sufficient pressure on the seal ring relative to the pressure on the other side of the seal ring. Also, the sealing efficiency obtained when the shaft is not rotating leaves much to be desired.

SUMMARY OF THE INVENTION

The object of the invention is to improve a shaft seal ring in such a way that it will seal about a shaft equally well with and without relative rotation between the seal ring and shaft and even with high-pressure differentials, above 50 bars and, more particularly, above 100 bars, of the medium to be sealed-in across the shaft seal ring.

In accordance with the invention, this object is accomplished with a shaft seal ring having a support ring for fixedly mounting the shaft seal ring about a shaft co-axially rotatable in the shaft seal ring and a lip ring fixed at one end to the support ring. The lip ring has first and second conical surfaces generally co-axial with the shaft seal ring, converging towards each other, and intersecting to define a sealing edge innermost on the lip ring for sealingly engaging about the shaft slidably, preferably with the aid of a garter spring about the lip ring generally opposite the sealing edge. The second conical surface extends toward the end of the lip ring fixed to the support ring. Channels are spaced about the second conical surface, preferably uniformly. The channels extend from the sealing edge with lateral surfaces axial of the shaft seal ring to a non-channeled portion of the second conical surface.

At least the portion of the lip ring along the second conical surface is resilient, for example made of an elastic polymer, preferably rubber. This permits the channels to collapse at the sealing edge when the shaft is stationary under the engagement pressure from the garter spring, for example, sufficiently for sealing about the shaft when the pressure differential across the shaft seal ring is not too great, and regardless of shaft rotation.

As pressure increases in the liquid to be sealed in, which is on the side of the sealing edge with the first conical surface, the pressure flexes the resilient portion of the lip ring at the second conical surface to press the second conical surface against the shaft, evenly if the pressure is high enough. This increases the area of the seal between the lip ring and shaft from that of just the sealing edge to maintain the seal against the increasing pressure.

If the shaft is then rotating, for example when the shaft seal ring is used in a pump in which the shaft rotation pumps up the pressure which flexes the second conical surface of the lip ring, however, the flexure-increased area of contact between the second conical surface and the shaft would not be adequately lubricated against the friction of the rotating shaft, except for the channels. This occurs, for example, in the design according to the above-mentioned German Pat. No. 16 00 458 in which the portions farther from the sealing edge are not adequately lubricated and thus frictionally abraded and over heated to destroy the sealing surface progressively toward its sealing edge until the seal ring ultimately fails, prematurely.

With the invention, however, the rotation of the shaft encourages the higher-pressure liquid to flow into the channels and from the channels into a lubricating film between the shaft and the portion of the second conical surface flexed against the shaft. Further, because the channels extend only to the non-channeled portion of the second conical surface, the non-channeled portion of the surface keeps the lubrication liquid from leaking past the shaft seal ring. Because the non-channeled portion of the second conical surface only has to seal against the channel-supplied lubrication liquid and not, therefore, the full liquid pressure, it can be sufficiently narrow relative to the spread of the lubricating liquid between the second conical surface and the shaft to avoid the frictional destruction described above.

In short, the frictional difficulties of the art are not encountered with the design according to the invention. They are avoided in that lubrication liquid is fed to the portions of the second conical surface which are remote from the sealing edge through the channels. The friction in proximity to that surface, and hence the frictional heat generated, thus will not rise above the critical, destructive threshold.

Because the channels in the proposed design are bounded by lateral surfaces extending parallel to the axis of rotation, they are unable to exert any hydrodynamic backfeed action on the sealed-in liquid. The lateral surfaces of the channels, however, at their bases in the second conical surface, should make an angle with the surface of not more than 90°, and preferably an angle of from about 40° to about 60°. Larger angles may require closer spacing of adjacent channels. Smaller angles may result in undesirable leakage when the liquid being sealed is highly fluid. The cross-sectional configuration may be as desired, for example rectangular, triangular, or semicircular. Hybrid configurations are also readily usable.

The channels should be of very-small cross-sectional dimensions, for example a depth of from about 0.01 to about 0.05 mm and a width of from about 0.03 to about 1.0 mm. In a preferred embodiment, the channel depth is 0.03 mm, and the channel width, 0.06 mm. The channel spacing around the second conical surface should generally range from about 1 to about 5 mm and preferably from about 2 to about 3 mm.

The shaft seal ring of the invention provides highly reliable sealing action under both static and dynamic conditions against pressures as high as 100 bars and higher.

DESCRIPTION OF THE DRAWINGS

Preferred embodiments which are intended to illustrate the invention but not to limit it will now be described in greater detail with reference to the accompanying drawing, wherein.

DESCRIPTION OF THE PREFERRED EMBODIMENTS

Figure 1:
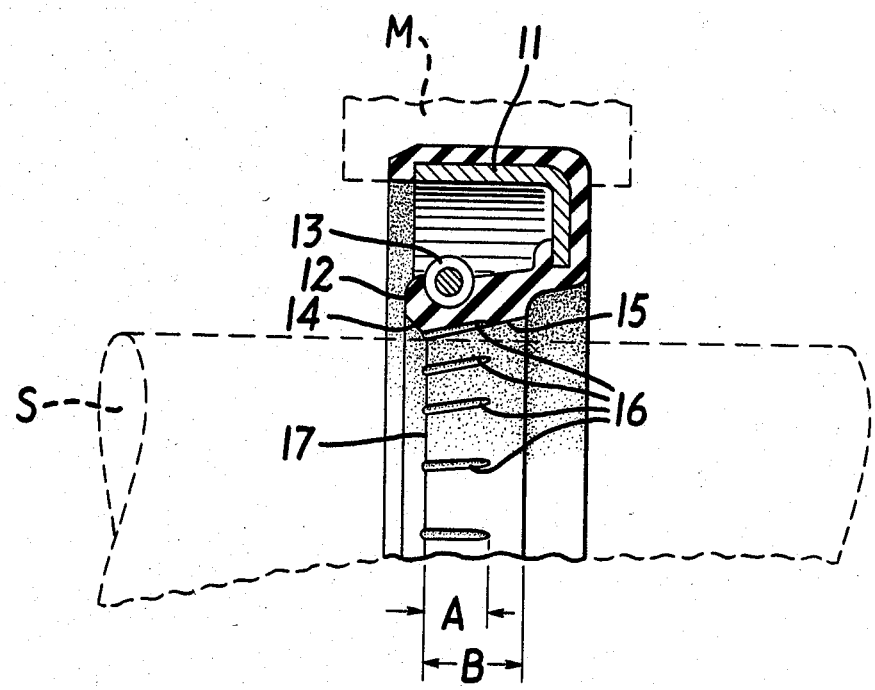
FIG. 1 is a half, sectional, edge view of a first embodiment.

The shaft seal ring shown in FIG. 1 has an L-section support ring 11 arranged for fixedly and sealingly mounting the shaft seal ring in an annular machine element M. The machine element M and half a shaft S co-axially rotatable therein are shown in phantom merely to aid in orienting the shaft seal ring and are not part thereof.

To arrange for fixedly and sealingly mounting the shaft seal ring with the L-section support ring 11, one leg of the support ring is resiliently coated and pressed into a groove extending around the annular machine element M. The other leg projects radially inward and fixedly receives one end of a resilient lip ring 12 which is, in this case, directly vulcanized on with the resilient coating. The lip ring has an innermost sealing edge 17 formed by intersecting first and second conical surfaces 14 and 15, respectively. A garter spring 13 placed about the lip ring radially outside the sealing edge 17 urges the lip ring evenly against the sealed shaft S.

The second conical surface 15 of the lip ring extends away from the liquid to be sealed. It has a plurality of channels 16 which are uniformly distributed about its circumference and which are open toward the sealed liquid, i.e. they penetrate the sealing edge 17. These channels have a triangular section, as shown in FIG. 2, and are of uniform depth over their entire axial extension.

When pressure acts on the shaft seal ring from the left in FIG. 1, the lip ring is elastically deformed, which results in axial surface contact between the second conical surface 15 and the surface of the sealed shaft S. At the same time, sealed medium penetrates into the channels 16 and is uniformly distributed over the entire contract surface when the sealed shaft rotates to provide adequate lubrication. Adequate sealing of the conical surface against the surface of the sealed shaft is assured in this case because the axial extension A of the channels is smaller than the axial extension B of the conical surface bearing on the shaft. The size of the second conical surface is approximately equal to that of the hydraulically-acting opposite side of the lip ring.

Figure 2:
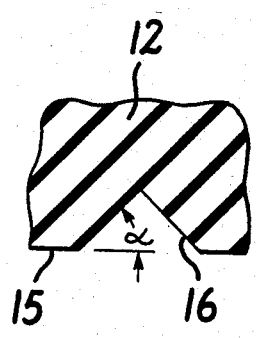
FIG. 2 is an enlarged, fragmentary, front, cross-sectional view of a channel portion of the embodiment shown in FIG. 1.
Figure 3:
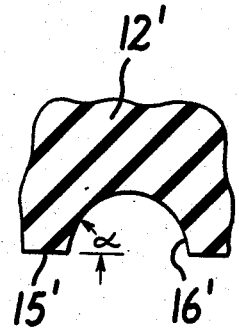
FIG. 3 is a view like FIG. 2 of another embodiment.
Figure 4:
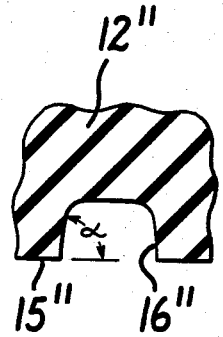
FIG. 4 is a view like FIG. 3 of another embodiment.

FIGS. 2 to 4 are cross sections through exemplary embodiments of channels 16, 16', and 16" in lip rings 12, 12', and 12". FIG. 2 shows the embodiments of FIG. 1 with a triangular section. In this case, the angle alpha of the lateral sides of the channels 16 to the second conical surface 15 is 45°. The lateral surfaces are, of course, plane. FIG. 3 relates to an embodiment in which the lateral surfaces pass into each other to form an arc. The lateral surfaces and the second conical surface 15' make an angle of 68°. FIG. 4 shows a rectangular channel cross section. In this case, the lateral surfaces, which pass into each other with rounded corners, make an angle of 90° with the surface of the second conical surface 15".

Reverting to FIG. 1, the width B of the second conical surface 15 is clearly defined by the sealing edge 17 and an opposite step (on the right in FIG. 1) in the lip ring 12. The step is not essential to the invention. The ratio of the length A of the channels 16 and the maximum width B of the second conical surface 15 which contacts the shaft S under pressure, to the step in FIG. 1, preferably is from about 0.6 to 0.9.

In an alternative embodiment, not shown, the channels progressively increase in depth toward the sealing edge.

The ratio of the spacing between successive channels about the second conical surface and the length A of the channels is preferably from about 0.5 to about 2.

It will be appreciated that the instant specification and claims are set forth by way of illustration and not of limitation, and that various changes and modifications may be made without departing from the spirit and scope of the present invention.

What is claimed is:

1. A shaft seal ring for forming a liquid seal between an annular machine element and a shaft co-axially rotatable therein, the shaft seal ring comprising:
   a support ring for mounting the shaft seal ring on the machine element fixedly and liquid tight;
   a resilient lip ring projecting from an end fixed to the support ring for engaging the shaft;
   first and second conical surfaces on the lip ring converging toward each other with the axis of each thereof substantially co-axial with the shaft seal ring and intersecting each other for defining an innermost sealing edge on the lip ring, the second conical surface extending along a portion of the lip ring between the sealing edge and the end of the lip ring fixed to the support ring;
   channels spaced about the second conical surface having lateral sides extending generally parallel to the axis of the shaft seal ring from the sealing edge only to a non-channeled portion of the second conical surface, the resilience of the portion of the lip ring along which the second conical surface extends relative to the width of the second conical surface axially of the shaft seal ring being such that sufficiently higher liquid pressures on the side of the shaft seal ring having the first conical surface can force the second conical surface sealingly against the shaft to the non-channeled portion thereof, whereby the channels serve to admit sufficient of the higher-pressure liquid along the second conical surface for lubricating the sliding, sealing engagement thereof with the shaft; and
   means for urging the sealing edge into slidable engagement with the shaft sufficiently for sealing the sealing edge and channels about the shaft at lower liquid pressures on the side of the shaft seal ring having a the first conical surface.

2. The shaft seal ring according to claim 1, wherein the lateral surfaces of the channels and the second conical surface make an angle of from about 20° to about 90° with one another.

3. The shaft seal ring according to claims 1 and 2, wherein the angle ranges from about 40° to about 60°.

4. The shaft seal ring according to claim 1, wherein the cross section of the lateral surfaces of the channels are curved.

5. The shaft seal ring according to claim 2, wherein the cross section of the lateral surfaces of the channels are curved.

6. The shaft seal ring according to claim 3, wherein the cross section of the lateral surfaces of the channels are curved.

7. The shaft seal ring according to claim 1 wherein the ratio between the length of the channels to the non-channeled portion of the second conical surface and the width of the second conical surface which can engage the shaft under pressure ranges from about 0.6 to about 0.9.

8. The shaft seal ring according to claim 2 wherein the ratio between the length of the channels to the non-channeled portion of the second conical surface and the width of the second conical surface which can engage the shaft under pressure ranges from about 0.6 to about 0.9.

9. The shaft seal ring according to claim 4 wherein the ratio between the length of the channels to the non-channeled portion of the second conical surface and the width of the second conical surface which can engage the shaft under pressure ranges from about 0.6 to about 0.9.

10. The shaft seal ring according to claim 6 wherein the ratio between the length of the channels to the non-channeled portion of the second conical surface and the width of the second conical surface which can engage the shaft under pressure ranges from about 0.6 to about 0.9.

11. The shaft seal ring according to claim 1, wherein the depth of the channels increases towards the sealing edge.

12. The shaft seal ring according to claim 2, wherein the depth of the channels increases towards the sealing edge.

13. The shaft seal ring according to claim 4, wherein the depth of the channels increases towards the sealing edge.

14. The shaft seal ring according to claim 7, wherein the depth of the channels increases towards the sealing edge.

15. The shaft seal ring according to claim 10, wherein the depth of the channels increases towards the sealing edge.

16. The shaft seal ring according to claim 1, wherein the ratio of the spacing between successive channels about the second conical surface to the length of the channels ranges from about 0.5 to about 2.

17. The shaft seal ring according to claim 2, wherein the ratio of the spacing between successive channels about the second conical surface to the length of the channels ranges from about 0.5 to about 2.

18. The shaft seal ring according to claim 4, wherein the ratio of the spacing between successive channels about the second conical surface to the length of the channels ranges from about 0.5 to about 2.

19. The shaft seal ring according to claim 7, wherein the ratio of the spacing between successive channels about the second conical surface to the length of the channels ranges from about 0.5 to about 2.

20. The shaft seal ring according to claim 5, wherein the ratio of the spacing between successive channels about the second conical surface to the length of the channels ranges from about 0.5 to about 2.

* * * * *